(12) United States Patent
Chijiiwa

(10) Patent No.: US 8,491,202 B2
(45) Date of Patent: Jul. 23, 2013

(54) MIRROR RETENTION STRUCTURE AND CAMERA EQUIPPED THEREWITH

(75) Inventor: Tomoki Chijiiwa, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/477,702

(22) Filed: May 22, 2012

(65) Prior Publication Data

US 2012/0230667 A1 Sep. 13, 2012

Related U.S. Application Data

(63) Continuation of application No. 12/929,762, filed on Feb. 14, 2011, now abandoned, which is a continuation of application No. 12/379,200, filed on Feb. 13, 2009, now abandoned.

(30) Foreign Application Priority Data

Feb. 15, 2008 (JP) .................................. 2008-035185

(51) Int. Cl.
*G03B 15/00* (2006.01)
*G02B 7/182* (2006.01)
(52) U.S. Cl.
USPC ........................................... 396/352; 359/872
(58) Field of Classification Search
USPC .......... 396/352, 354, 356, 358; 359/872–874, 359/876, 877
See application file for complete search history.

(56) References Cited

U.S. PATENT DOCUMENTS

| 4,843,420 | A | * | 6/1989 | Fukuda et al. | ............... 396/272 |
| 6,003,999 | A | | 12/1999 | Kitaoka et al. | |
| 7,674,051 | B2 | | 3/2010 | Fujikawa | |
| 2004/0096206 | A1 | | 5/2004 | Morishita | |

FOREIGN PATENT DOCUMENTS

| JP | 57-111523 | 7/1982 |
| JP | 9-203974 | 8/1997 |
| JP | 9-274250 | 10/1997 |
| JP | 2001-262918 | 9/2001 |
| JP | 2004-240281 | 8/2004 |
| JP | 2005-345611 | 12/2005 |
| JP | 2007-114512 | 5/2007 |

OTHER PUBLICATIONS

Office Action mailed from the United States Patent and Trademark Office on Mar. 29, 2011 in the parent U.S. Appl. No. 12/929,762.
Office Action mailed from the United States Patent and Trademark Office on Nov. 22, 2011 in the parent U.S. Appl. No. 12/929,762.
Notice of Reasons for Rejection issued to Japanese Application No. 2008-035185, mailed Jan. 15, 2013.

* cited by examiner

*Primary Examiner* — WB Perkey
*Assistant Examiner* — Minh Phan

(57) ABSTRACT

A mirror retention structure to reduce rebounding of a sub-mirror and to prevent shifting of the mirror-down position. The mirror retention structure includes, a main mirror retention frame that retains a main mirror, a sub-mirror retention frame that retains a sub-mirror and is axially supported at the main mirror retention frame, and a receiving pin that abuts against the sub-mirror retention frame and sets an angle of the sub-mirror at a mirror-down position, wherein the sub-mirror retention frame is provided with a first abutting portion that touches against the receiving pin at the mirror-down position, and a second abutting portion, at a different position from the first abutting portion, that touches against the receiving pin at a position prior to the mirror-down position in a transition from a mirror-up position to the mirror-down position.

7 Claims, 4 Drawing Sheets

MIRROR RETENTION STRUCTURE AND CAMERA EQUIPPED THEREWITH

CROSS-REFERENCE TO RELATED APPLICATIONS

This application is a continuation of and claims priority benefit to U.S. patent application Ser. No. 12/929,762, filed Feb. 14, 2011 now abandoned which is a continuation of and claims priority benefit to U.S. patent application Ser. No. 12/379,200, filed Feb. 13, 2009, now abandoned, which application in turn is based upon and claims the benefit of priority under 35 U.S.C. §119 to Japanese Patent Application No. 2008-035185 filed on Feb. 15, 2008, the entire contents of which are incorporated herein by reference.

BACKGROUND

1. Field

The present invention relates to a mirror retention structure and to a camera equipped therewith.

2. Description of the Related Art

Heretofore, there has been a mirror retention structure that is provided with: a main mirror retention frame that retains a main mirror; a sub-mirror retention frame that retains a sub-mirror and is axially supported at the main mirror retention frame; and an receiving pin that touches against the sub-mirror retention frame and sets an angle of the sub-mirror at a mirror-down position. In this conventional mirror retention structure, the angle of the sub-mirror is set by a portion of the sub-mirror retention frame abutting against the receiving pin when the sub-mirror comes into the mirror-down position (see, for example, Japanese Unexamined Patent Publication No. H9-203974).

SUMMARY

However, in the conventional mirror retention structure, when the sub-mirror comes to the mirror-down position, the sub-mirror retention frame strikes against the receiving pin and the sub-mirror rebounds. Further, if mirror-down is performed many times, the portion of the receiving pin that abuts against the sub-mirror retention frame is worn down and the mirror-down position of the sub-mirror is shifted.

Objects of the present invention are to reduce rebounding of a sub-mirror and to prevent shifting of the mirror-down position.

The present invention solves the above-described problem with the following solution.

In order to achieve the object mentioned above, according to a first aspect of the present invention, there is provided a mirror retention structure comprising, a main mirror retention frame that retains a main mirror, a sub-mirror retention frame that retains a sub-mirror and is axially supported at the main mirror retention frame, and a receiving pin that abuts against the sub-mirror retention frame and sets an angle of the sub-mirror at a mirror-down position, wherein the sub-mirror retention frame is provided with, a first abutting portion that touches against the receiving pin at the mirror-down position, and a second abutting portion, at a different position from the first abutting portion, that touches against the receiving pin at a position prior to the mirror-down position in a transition from a mirror-up position to the mirror-down position.

The first abutting portion may be formed at a surface parallel with the sub-mirror, and the second abutting portion is formed at a surface that is inclined to face an axis of rotation of the sub-mirror with respect to the main mirror retention frame.

A portion of the receiving pin that abuts against the first abutting portion may be different from a portion of the receiving pin that abuts against the second abutting portion.

At the mirror-down position, the first abutting portion may be disposed at a photography lens side relative to a position at which the sub-mirror is retained.

The receiving pin may be an eccentric pin.

In order to achieve the object mentioned above, according to a second aspect of the present invention, there is provided a camera comprising the mirror retention structure according to the first aspect of the present invention.

The constitutions described hereabove may be suitably modified, and at least portions thereof may be substituted with other constituents.

According to the present invention, rebounding of a sub-mirror may be reduced and shifting of a mirror-down position prevented.

BRIEF DESCRIPTION OF THE DRAWINGS

In the drawings attached.

DESCRIPTION OF EMBODIMENTS

Figure 1:
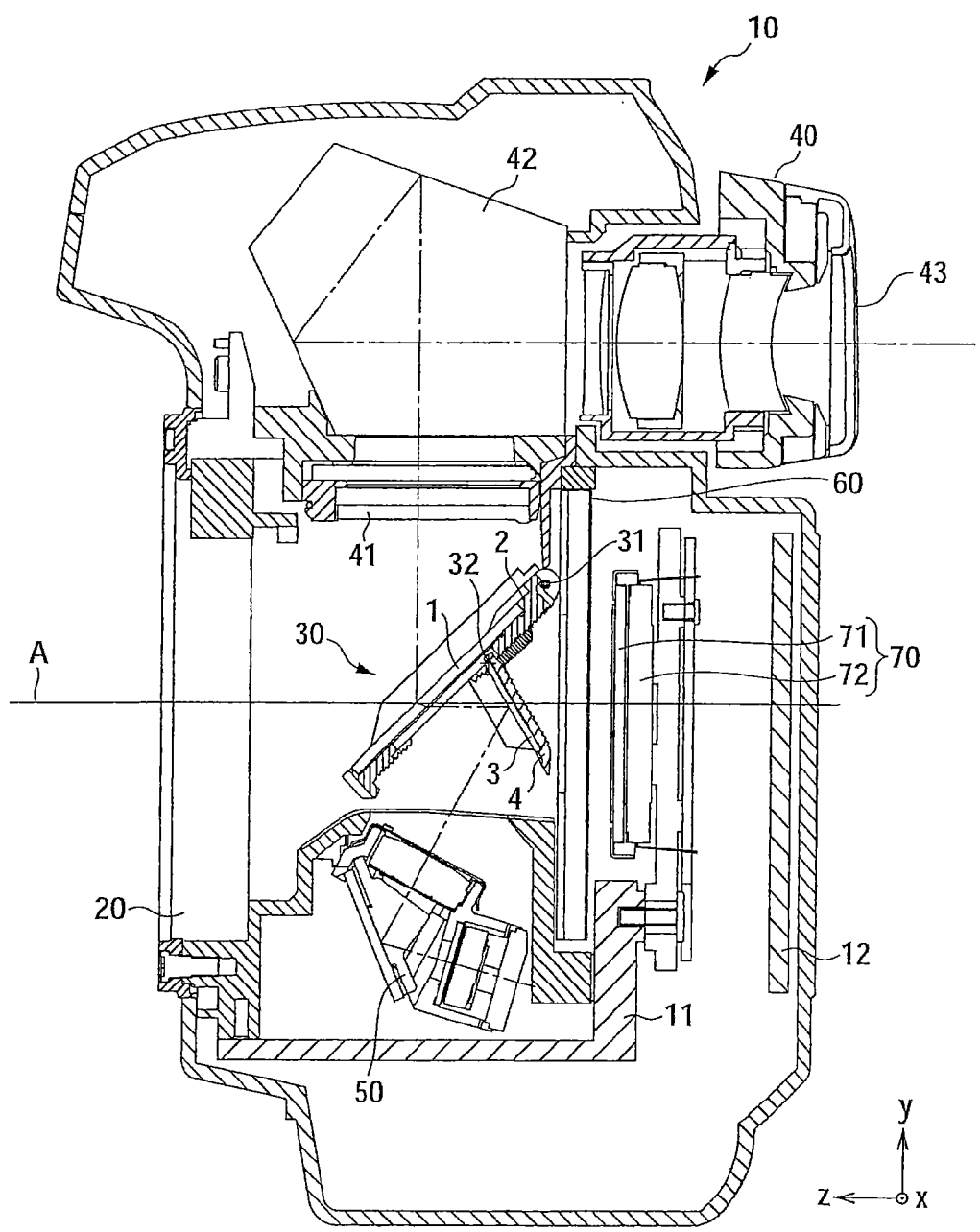
FIG. 1 is a sectional view showing a camera incorporating an embodiment of the mirror retention structure of the present invention.

Herebelow, a preferred embodiment of the present invention will be described with reference to the attached drawings and suchlike. FIG. 1 is a sectional view of a camera 10 of the present embodiment. In FIG. 1, an xyz orthogonal coordinate system is established for ease of description and understanding. In this coordinate system, for a position of the camera when a photographer is keeping the optical axis A horizontal and photographing a landscape orientation image (hereinafter referred to as a usual photography position), a direction to leftward from the photographer's point of view is the +x direction. The direction to upward in the usual photography position is the +y position, and the direction toward the subject in the usual photography position is the +z position.

The camera 10 of the present embodiment is a digital single lens reflex camera. The camera 10 includes a frame main body portion 11, an image display portion 12, a mount portion 20, a mirror retention mechanism portion 30, a viewfinder portion 40, a range sensor portion 50, a shutter portion 60 and an imaging portion 70.

The frame main body portion 11 is a main frame of the camera 10, to which the respective portions of the camera 10 are fixed. The image display portion 12 is provided at a rear portion of the camera 10. The image display portion 12 is a liquid crystal display that shows subjects photographed by the imaging portion 70, and information relating to operations, photographed subjects and so forth. The mount portion 20 is a portion at which an unillustrated photography lens is removably mounted. The photography lens is a lens unit at which object light is incident. The incident object light is emitted to the mirror retention mechanism portion 30. The photography lens is interchangeable in accordance with photography requirements. A zoom-type lens unit that magnifies and reduces subject images, a single point focus-type lens unit, or the like may be employed.

The viewfinder portion 40 includes a viewfinder screen 41, a Dach pentaprism 42 and an eyepiece portion 43. The viewfinder screen 41 is disposed above the mirror retention mechanism portion 30, and is a screen for inputting and focusing object light that is reflected thereat when the mirror retention mechanism portion 30 is in a viewing state. The Dach pentaprism 42 is disposed above the viewfinder screen 41, and is a polygonal prism that emits the object light focused by the viewfinder screen 41 toward the eyepiece portion 43. The eyepiece portion 43 is an eyepiece optical system disposed at a position on which the object light emitted from the Dach pentaprism 42 is incident.

The range sensor portion 50 is a sensor at which object light reflected by the mirror retention mechanism portion 30 is incident. The range sensor portion 50 is provided for adjusting the focusing point to the subject of the camera 10. The shutter portion 60 is provided with a plural number of unillustrated shutter blade units. The shutter portion 60 opens and closes the shutter blade units in accordance with photography instructions from an unillustrated release switch or the like, and causes object light to be incident on the imaging portion 70.

The imaging portion 70 is disposed at a position at which object light that has passed through the shutter portion 60 is incident. The imaging portion 70 is provided with a low pass filter 71 and an imaging device 72. The imaging device 72 is a CCD (Charge-Coupled Device) which is disposed behind the low pass filter 71. The imaging device 72 is exposed to the object light that is incident thereon via the low pass filter 71, converts the object light to electronic image signals, and outputs the image signals to an unillustrated image processing section. The imaging device 72 is not limited to being a CCD. For example, a CMOS (Complementary Metal Oxide Semiconductor) device may be employed.

The mirror retention mechanism portion 30 is a mechanism that includes a main mirror 1 and a sub-mirror 3. The mirror retention mechanism portion 30 is disposed at a position at which object light, which is emitted from the rear portion of the photography lens disposed at the mount portion 20, is incident. The mirror retention mechanism portion 30 causes the object light to be incident on the viewfinder portion 40, the range sensor portion 50, the shutter portion 60 and the imaging portion 70 as appropriate.

The mirror retention mechanism portion 30 is provided with a main mirror retention frame 2 which retains the main mirror 1 and a sub-mirror retention frame 4 which retains the sub-mirror 3. The sub-mirror retention frame 4 is disposed to the rear side of the main mirror retention frame 2 along the optical axis A. Thus, the sub-mirror 3 is disposed at the rear side of the main mirror 1. The main mirror 1 is a reflection mirror that reflects object light toward the viewfinder portion 40. A semi-transmissive mirror (not shown) which transmits light is provided at a portion of the reflection surface of the main mirror 1. At the semi-transmissive mirror, the object light is party not reflected but transmitted to the rear of the main mirror 1, and the transmitted object light is incident on the sub-mirror 3 disposed to the rear. The sub-mirror 3 is a reflection mirror that reflects the object light transmitted through the semi-transmissive mirror of the main mirror 1 toward the range sensor portion 50.

FIG. 1 shows a case in which the mirror retention mechanism portion 30 is in the mirror-down state. The main mirror 1 reflects the object light to the viewfinder portion 40, enabling viewing of the subject at the viewfinder portion 40. At this time, the sub-mirror 3 is disposed at the rear side of the main-mirror 1, spaced apart from the main mirror 1, and reflects a portion of the object light toward the range sensor portion 50. The range sensor portion 50 adjusts the focusing point to the subject in accordance with this object light. When the unillustrated release switch is pressed or suchlike and photography is executed, the main mirror retention frame 2 turns in the clockwise direction of FIG. 1 and moves toward the viewfinder portion 40. At the same time, the sub-mirror retention frame 4 turns in the clockwise direction and moves so as to lie flat with the main mirror retention frame 2. Thus, the mirror retention mechanism portion 30 is withdrawn from the optical axis A and goes into the mirror-up state. The object light is incident on the shutter portion 60 and imaging portion 70 disposed to the rear of the mirror retention mechanism portion 30. In this condition, photography can be executed. When photography ends, the main mirror retention frame 2 turns in the anticlockwise direction, and the sub-mirror retention frame 4 turns in the anticlockwise direction away from the main mirror retention frame 2. Thus, the mirror retention mechanism portion 30 returns to the mirror-down state of FIG. 1.

As described above, it is necessary for the main mirror 1 and the sub-mirror 3 to turn between the mirror-up state and the mirror-down state. The main mirror retention frame 2 is turnably mounted at a main support shaft 31, while the sub-mirror retention frame 4 is turnably mounted at a sub support shaft 32. The main support shaft 31 is mounted at the frame main body portion 11, and turnably supports an upper portion of the main mirror retention frame 2. The sub support shaft 32 is mounted at a central portion of the main mirror retention frame 2, and turnably supports an upper portion of the sub-mirror retention frame 4. The turning in the clockwise direction of the main mirror retention frame 2 is implemented by an unillustrated motor, and the turning in the clockwise direction of the sub-mirror retention frame 4 is also implemented by a motor.

Figure 2:
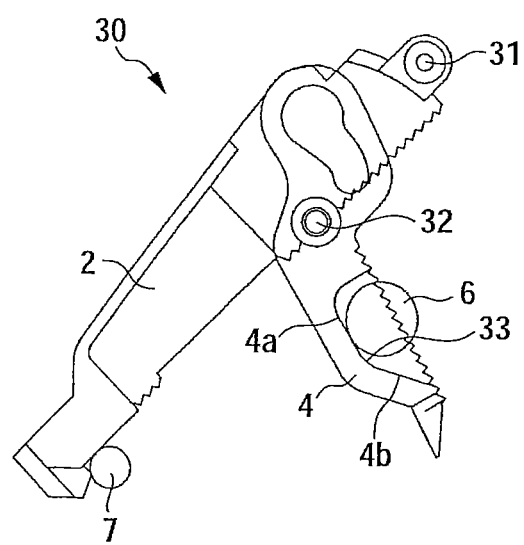
FIG. 2 is a side view showing a mirror-down position of a mirror retention mechanism portion.
Figure 3:
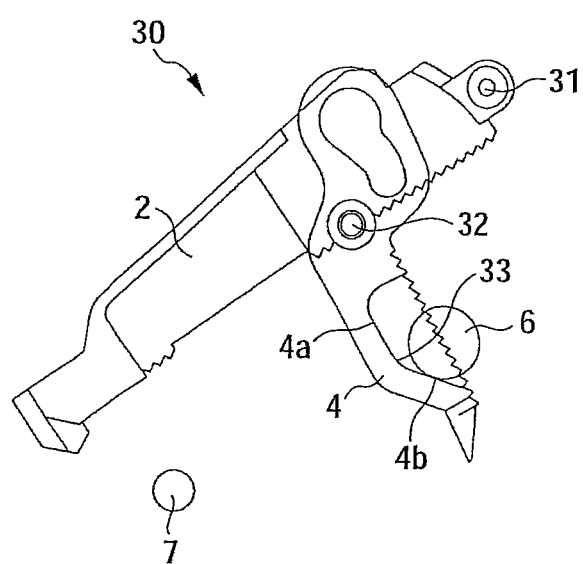
FIG. 3 is a side view showing a position prior to the mirror-down position of the mirror retention mechanism portion.

FIG. 2 shows the mirror retention mechanism portion 30 in the mirror-down state, and FIG. 3 shows a state prior to transition into the mirror-down state. The turning in the anticlockwise direction to return from the mirror-up state to the mirror-down state is implemented by springs. Accordingly, an unillustrated return spring, constituted by a coil spring or the like, is provided at the main support shaft 31 and urges the main mirror retention frame 2 in the anticlockwise direction. An unillustrated return spring, such as a toggle spring or the like, is provided between the main mirror retention frame 2 and the sub-mirror retention frame 4, and urges the sub-mirror retention frame 4 in the anticlockwise direction.

At the mirror-down position, it is necessary for the main mirror 1 and the sub-mirror 3 to be stopped at predetermined angles. Accordingly, a stopper pin 7 and a receiving pin 6 are provided at the frame main body portion 11. The stopper pin 7 sets the angle of the main mirror retention frame 2 at the mirror-down position, and thus sets the angle of the main mirror 1, by the main mirror retention frame 2 abutting against the stopper pin 7. The receiving pin 6 sets the angle of the sub-mirror retention frame 4 at the mirror-down position, and thus sets the angle of the sub-mirror 3, by the sub-mirror retention frame 4 abutting against the receiving pin 6.

As shown in FIG. 2 and FIG. 3, a first abutting portion 4a and a second abutting portion 4b are formed at the sub-mirror retention frame 4. The first abutting portion 4a is a surface that touches against the receiving pin 6 at the mirror-down position. The second abutting portion 4b is a surface that touches against the receiving pin 6 prior to transition into the mirror-down position. The abutting portions 4a and 4b are formed by a recess portion 33 being formed at a rear face of the sub-mirror retention frame 4 and a flat surface being provided at a bottom face of the recess portion 33. The recess portion 33 is a hollow that opens to the receiving pin 6 side. When the sub-mirror retention frame 4 turns in the clockwise direction, the receiving pin 6 can relatively approach the sub-mirror retention frame 4 through the opening portion of the recess portion 33.

The first abutting portion 4a is formed on a surface parallel with the sub-mirror 3. The first abutting portion 4a is disposed at the photography lens side (the mount portion 20 side) relative to the position (not shown) at which the sub-mirror 3 is retained by the sub-mirror retention frame 4. The second abutting portion 4b is formed integrally with the first abutting portion 4a, on a surface that is inclined, relative to the sub-mirror 3, to a direction toward the center of rotation of the sub-mirror 3 (i.e., the sub support shaft 32).

Next, operation of the mirror retention mechanism portion 30 of the embodiment of the present invention is described. During the transition to the mirror-down state, the main mirror retention frame 2 is turned in the anticlockwise direction by the return spring thereof, and the sub-mirror retention frame 4 is turned in the anticlockwise direction by the return spring thereof. In accordance with the turning of the sub-mirror retention frame 4, the receiving pin 6 abuts against the second abutting portion 4b as shown in FIG. 3. As the main mirror retention frame 2 turns further in the anticlockwise direction, the receiving pin 6 slides along the inclined face of the second abutting portion 4b. Then, when the main mirror retention frame 2 abuts against the stopper pin 7, the receiving pin 6 abuts against the first abutting portion 4a, and the turning of the main mirror retention frame 2 and the sub-mirror retention frame 4 stops. The angle of the main mirror 1 retained by the main mirror retention frame 2 and the angle of the sub-mirror 3 retained by the sub-mirror retention frame 4 are set by this abutting.

Thus, according to the present embodiment, the following effects are provided.

(1) The first abutting portion 4a and second abutting portion 4b formed at the sub-mirror retention frame 4 are planar structures rather than three-dimensional structures. Therefore, the structure is simple, fabrication is easy, accurate formation is possible, and formation in a small amount of space is possible.

(2) The sub-mirror retention frame 4 is stopped by the second abutting portion 4b abutting against the receiving pin 6 and then the first abutting portion 4a abutting against the receiving pin 6. With these two stages of abutting, an impact caused by the abutting against the receiving pin 6 can be reduced, and durability is improved.

(3) Because the second abutting portion 4b of the sub-mirror retention frame 4 is an inclined surface, a rebounding force when the second abutting portion 4b abuts against the receiving pin 6 is reduced. Therefore, an amount of rebound of the sub-mirror retention frame 4 can be reduced.

Figure 4A:
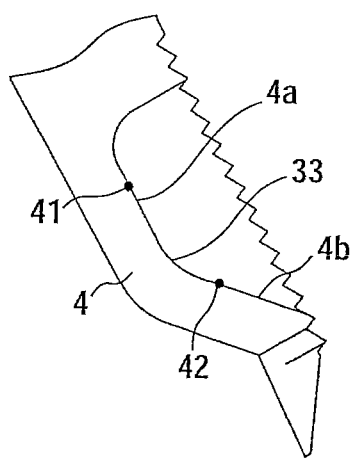
FIG. 4A and FIG. 4B are side views showing respective contact points of a sub-mirror retention frame and a receiving pin.
Figure 4B:
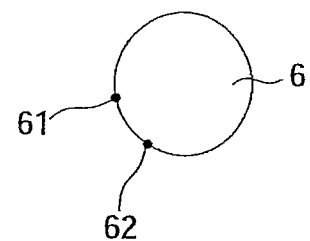

(4) FIG. 4A shows positions of points at which the sub-mirror retention frame 4 comes into contact with the receiving pin 6. The first abutting portion 4a touches against the receiving pin 6 at a point 41, and the second abutting portion 4b touches against the receiving pin 6 at a point 42. FIG. 4B shows points at which the receiving pin 6 comes into contact with the sub-mirror retention frame 4. A point 61 touches against the first abutting portion 4a, and a point 62, at a location separated from the point 61, touches against the second abutting portion 4b. Thus, the receiving pin 6 touches the sub-mirror retention frame 4 at two locations, the points 61 and 62. Inertial force is almost completely absorbed by the impact when the second abutting portion 4b first touches against the receiving pin 6. Thereafter, at the mirror-down position, the first abutting portion 4a touches against the receiving pin 6 and the sub-mirror retention frame 4 is stopped. Therefore, an impact between the point 41 and the point 61 is small, and amounts of wear are small. As a result, even with a large number of photography cycles, variation in the angle of the sub-mirror retention frame 4, and thus of the sub-mirror 3, can be kept small.

(5) Because the first abutting portion 4a which sets the mirror-down position of the sub-mirror 3 is a surface that is parallel with the sub-mirror 3, it is easy to adjust the stopping angle of the sub-mirror 3.

(6) Because the first abutting portion 4a is disposed at the photography lens side relative to the retention position of the sub-mirror 3, other members may be disposed with room to spare. That is, because the first abutting portion 4a is disposed at the photography lens side, space can be assured even with a constitution in which the gap between the mirror retention mechanism portion 30 and the imaging portion 70 is reduced by provision for dust reduction and the like.

[Modified Form]

The present invention may be modified and altered in various ways as follows without being limited to the above-described embodiments and such modifications and alterations are also within the technical scope of the present invention.

(1) The receiving pin 6 may be an eccentric pin. If the receiving pin 6 is an eccentric pin, it may be turned and the position thereof finely adjusted. Thus, the position of the sub-mirror 3 may be adjusted for individual cameras.

(2) The receiving pin 6 may be formed as a pin with some degree of thickness. If the receiving pin 6 is a thick pin, strength with respect to the abutting of the sub-mirror retention frame 4 may be increased. Moreover, the receiving pin 6 may abut with the first abutting portion 4a and the second abutting portion 4b in states close to surface contact. Consequently, impacts may be more greatly absorbed.

The embodiment and modified forms may be suitably combined and used, but detailed descriptions are not given herein. The present invention is not to be limited by the embodiments described hereabove.

What is claimed is:

1. A mirror retention structure comprising:
a main mirror retention frame that retains a main mirror;
a sub-mirror retention frame that retains a sub-mirror and is axially supported at the main mirror retention frame; and
a receiving pin that abuts against the sub-mirror retention frame and sets an angle of the sub-mirror at a mirror-down position, wherein
the sub-mirror retention frame is provided with:
a first abutting portion that touches against the receiving pin at the mirror-down position; and
a second abutting portion, at a different position from the first abutting portion, that touches against the receiving pin at a position prior to the mirror-down position in a transition from a mirror-up position to the mirror-down position,
wherein a surface of the second abutting portion is inclined to a direction toward an axis of rotation of the sub-mirror retention frame.

2. The mirror retention structure according to claim 1, wherein
a surface of the first abutting portion is configured to be parallel with the sub-mirror.

3. The mirror retention structure according to claim 1, wherein
a portion of the receiving pin that abuts against the first abutting portion is different from a portion of the receiving pin that abuts against the second abutting portion.

4. The mirror retention structure according to claim 1, wherein,
at the mirror-down position, the first abutting portion is disposed at a photography lens side relative to a position at which the sub-mirror is retained.

5. The mirror retention structure according claim 1, wherein
the receiving pin is an eccentric pin.

6. A camera comprising the mirror retention structure according to claim 1.

7. A mirror retention structure comprising:
a main mirror retention frame that retains a main mirror;
a receiving pin; and
a sub-mirror retention frame that retains a sub-mirror and is axially supported at the main mirror retention frame, the sub-mirror retention frame having a first abutting portion that contacts the receiving pin at a first position, and a second abutting portion that contacts the receiving pin at a second position that is different from the first position,
wherein a surface of the second abutting portion is inclined to a direction toward an axis of rotation of the sub-mirror retention frame.

\* \* \* \* \*

UNITED STATES PATENT AND TRADEMARK OFFICE
CERTIFICATE OF CORRECTION

PATENT NO. : 8,491,202 B2
APPLICATION NO. : 13/477702
DATED : July 23, 2013
INVENTOR(S) : Tomoki Chijiiwa Page 1 of 1

It is certified that error appears in the above-identified patent and that said Letters Patent is hereby corrected as shown below:

In the Claims

In Col. 7, Line 11, In claim 5, after "according" insert -- to --.

Signed and Sealed this
Twelfth Day of November, 2013

Teresa Stanek Rea
*Deputy Director of the United States Patent and Trademark Office*